(12) United States Patent
Shin et al.

(10) Patent No.: US 10,597,469 B2
(45) Date of Patent: Mar. 24, 2020

(54) METHOD FOR RECOVERING ETHYLENE AND VINYL-BASED COMONOMER

(71) Applicant: LG Chem, Ltd., Seoul (KR)

(72) Inventors: Dae Young Shin, Daejeon (KR); Eun Jung Joo, Daejeon (KR); Joon Ho Shin, Daejeon (KR); Chang Hoe Heo, Daejeon (KR); Sung Keun Jang, Daejeon (KR)

(73) Assignee: LG Chem, Ltd. (KR)

( * ) Notice: Subject to any disclaimer, the term of this patent is extended or adjusted under 35 U.S.C. 154(b) by 73 days.

(21) Appl. No.: 15/743,491

(22) PCT Filed: Aug. 23, 2017

(86) PCT No.: PCT/KR2017/009215
§ 371 (c)(1),
(2) Date: Jan. 10, 2018

(87) PCT Pub. No.: WO2018/052201
PCT Pub. Date: Mar. 22, 2018

(65) Prior Publication Data
US 2019/0085101 A1 Mar. 21, 2019

(30) Foreign Application Priority Data
Sep. 19, 2016 (KR) .................. 10-2016-0119375

(51) Int. Cl.
| | | |
|---|---|---|
| C08F 218/08 | (2006.01) | |
| C08F 6/00 | (2006.01) | |
| C08L 101/00 | (2006.01) | |
| C08J 11/02 | (2006.01) | |
| C08F 210/02 | (2006.01) | |

(52) U.S. Cl.
CPC .............. C08F 6/005 (2013.01); C08F 6/001 (2013.01); C08F 210/02 (2013.01); C08J 11/02 (2013.01); C08L 101/00 (2013.01)

(58) Field of Classification Search
CPC .. C08F 6/001; C08F 6/005; C08F 6/10; C08F 6/12; C08F 210/02; C08F 210/16; C08F 218/08
See application file for complete search history.

(56) References Cited

U.S. PATENT DOCUMENTS

| | | | | |
|---|---|---|---|---|
| 3,509,115 A * | 4/1970 | French | ................... | C08F 10/00 |
| | | | | 528/481 |
| 4,082,910 A | 4/1978 | Buechner et al. | | |
| 4,215,207 A | 7/1980 | Durand et al. | | |
| 4,342,853 A | 8/1982 | Durand et al. | | |
| 4,416,856 A | 11/1983 | Durand et al. | | |
| 5,408,017 A * | 4/1995 | Turner | ................... | C07F 17/00 |
| | | | | 502/155 |
| 6,809,174 B2 | 10/2004 | Weitzel et al. | | |
| 2004/0192861 A1 | 9/2004 | Mutchler et al. | | |
| 2005/0215733 A1 | 9/2005 | Tsai et al. | | |
| 2007/0032614 A1 | 2/2007 | Goossens et al. | | |
| 2007/0185361 A1 | 8/2007 | Buchanan et al. | | |
| 2008/0269434 A1 | 10/2008 | Guenaltay et al. | | |
| 2008/0281040 A1 | 11/2008 | Kiss et al. | | |
| 2010/0022736 A1 * | 1/2010 | Van Nuland | ............... | B01J 3/04 |
| | | | | 526/352 |
| 2013/0125581 A1 | 5/2013 | Force et al. | | |
| 2014/0018462 A1 | 1/2014 | Tsuboi et al. | | |
| 2014/0251139 A1 | 9/2014 | Guenaltay et al. | | |
| 2015/0315119 A1 | 11/2015 | Neumann et al. | | |
| 2016/0289356 A1 | 10/2016 | Finette et al. | | |
| 2016/0325263 A1 | 11/2016 | Uhm et al. | | |

FOREIGN PATENT DOCUMENTS

| | | |
|---|---|---|
| CN | 103003316 A | 3/2013 |
| CN | 103619428 A | 3/2014 |
| CN | 103804556 A | 5/2014 |
| CN | 103772535 B | 3/2016 |
| EP | 0447177 A2 | 9/1991 |
| GB | 1338280 A | 11/1973 |
| JP | 3550593 B2 | 8/2004 |
| JP | 2006022209 A | 1/2006 |
| JP | 2006503174 A | 1/2006 |
| JP | 2010520363 A | 6/2010 |
| JP | 5030446 B2 | 9/2012 |
| KR | 20080026207 A | 3/2008 |
| KR | 20080085882 A | 9/2008 |
| KR | 101493531 B1 | 2/2015 |
| KR | 20150092314 A | 8/2015 |
| KR | 20150093225 A | 8/2015 |
| KR | 101568186 B1 | 11/2015 |
| KR | 20160092288 A | 8/2016 |

OTHER PUBLICATIONS

Supplementary European Search Report for EP Application No. 17823008.2, dated Sep. 4, 2018.

(Continued)

Primary Examiner — Rip A Lee
(74) Attorney, Agent, or Firm — Lerner, David, Littenberg, Krumholz & Mentlik, LLP

(57) ABSTRACT

The present invention relates to a method for recovering ethylene and a vinyl-comonomer that is capable of improving the rate of recovery of unreacted monomers remaining after polymerization of ethylene and a vinyl-based comonomer and increasing process efficiency through the reduction of costs.

Specifically, the method for recovering ethylene and a vinyl-comonomer includes: a step of polymerizing ethylene and a vinyl-based comonomer at a pressure of 1500 bar or more; a step of depressurizing the product obtained in the polymerization step including an ethylene-vinyl-based comonomer polymer, ethylene, and a vinyl-based comonomer to 0.1 bar to 5 bar; a step of adding ethylene to the product obtained in the polymerization step under the pressure of 0.1 bar to 5 bar; and a step of separating ethylene and a vinyl-based comonomer from the product obtained in the polymerization step to which the ethylene is added.

14 Claims, 1 Drawing Sheet

(56) References Cited

OTHER PUBLICATIONS

International Search Report for Application No. PCT/KR2017/009215 dated Dec. 11, 2017.
Chinese Search Report from Application No. 201780002732.6 dated Sep. 4, 2019, 1 page.

* cited by examiner

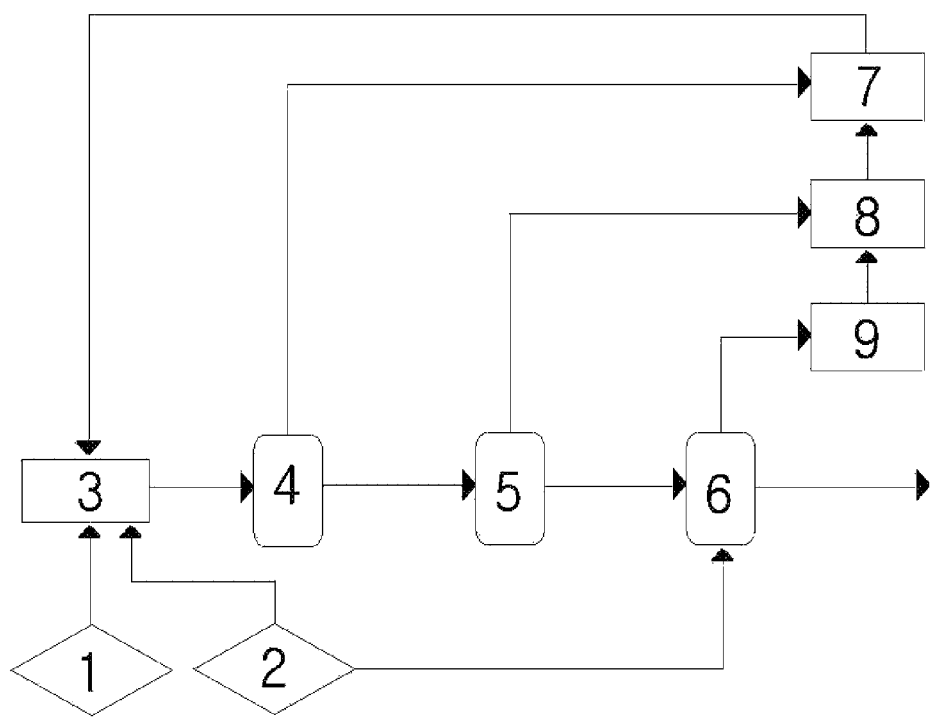

METHOD FOR RECOVERING ETHYLENE AND VINYL-BASED COMONOMER

CROSS-REFERENCE TO RELATED APPLICATIONS

The present application is a national phase entry under 35 U.S.C. § 371 of International Application No. PCT/KR2017/009215 filed Aug. 23, 2017, which claims priority from Korean Patent Application No. 10-2016-0119375 filed Sep. 19, 2016, all of which are incorporated herein by reference.

TECHNICAL FIELD

The present invention relates to a method for recovering ethylene and vinyl-based comonomer. More particularly, the present invention relates to a method for recovering ethylene and a vinyl-comonomer capable of improving the rate of recovery of unreacted monomers remaining after polymerization of ethylene and a vinyl-based comonomer, and increasing process efficiency through the reduction of costs.

BACKGROUND ART

Ethylene copolymers are materials to which various vinyl-based comonomers have been introduced into the existing properties of LDPE (Low Density Polyethylene), and have been developed for various uses and are widely commercialized.

Ethylene copolymers are produced in a continuous process through free radical addition polymerization between ethylene monomers and vinyl-based comonomers in a high pressure reactor. Specifically, ethylene copolymers can be synthesized through chain-growth polymerization in which a free radical is formed from an initiator, and double bond monomers charged in excess are continuously reacted.

In the synthesis of an ethylene copolymer, the monomer and the initiator are charged in a high-pressure reactor, and reactants behave like a supercritical fluid under high pressure and are present with unreacted monomers. Through this polymerization, only about 15 to 30% of the monomers involved in the polymerization and the rest are recovered and reused.

Therefore, in order to increase the efficiency of the synthesis of an ethylene copolymer, it is necessary to effectively recover the unreacted monomers not involved in the polymerization reaction, and induce them to undergo a re-polymerization reaction. To this end, a variety of studies have been conducted on techniques in which, after the polymerization reaction, a mixture of unreacted monomers and copolymers is depressurized to separate unreacted monomers from the polymer, and the separated unreacted monomers are again compressed and charged in a high-pressure reactor.

However, there was still a limitation in that unreacted monomers are not sufficiently recovered from the final product. There was also a limitation in the process efficiency that a lot of cost was consumed in the compression process for charging the depressurized unreacted monomers in the high pressure reactor.

In this regard, there is a need to develop a new method for recovering unreacted monomers of an ethylene copolymer capable of realizing a low cost and high efficiency while exhibiting a greater improvement in the rate of recovery of unreacted monomers compared with a conventional one.

DISCLOSURE

Technical Problem

It is one object of the present invention to provide a method for recovering ethylene and a vinyl-based comonomer capable of improving the rate of recovery of unreacted monomers remaining after polymerization of ethylene and a vinyl-based comonomer and increasing the process efficiency through the reduction of costs.

Technical Solution

The present invention provides a method for recovering ethylene and a vinyl-based comonomer including: a step of polymerizing ethylene and a vinyl-based comonomer at a pressure of 1500 bar or more; a step of depressurizing a product obtained in the polymerization step including an ethylene-vinyl-based comonomer polymer, ethylene, and a vinyl-based comonomer to 0.1 bar to 5 bar; and a step of adding ethylene to the product obtained in the polymerization step under the pressure of 0.1 bar to 5 bar.

Hereinafter, the method for recovering ethylene and a vinyl-based comonomer according to specific embodiments of the present invention will be described in more detail.

As used herein, the term "upper" means a portion corresponding to a height of 50% or more of the total height of the container and apparatus, and the term "lower" means a portion corresponding to a height of less than 50% of the total height of the container and apparatus.

According to one embodiment of the present invention, a method for recovering ethylene and vinyl-based comonomer may be provided, including: a step of polymerizing ethylene and a vinyl-based comonomer at a pressure of 1500 bar or more; a step of depressurizing a product obtained in the polymerization step including an ethylene-vinyl-based comonomer polymer, ethylene, and a vinyl-based comonomer to 0.1 bar to 5 bar; a step of adding ethylene to the product obtained in the polymerization step under the pressure of 0.1 bar to 5 bar; and a step of separating ethylene and the vinyl-based comonomer from the product obtained in the polymerization step to which ethylene is added.

The present inventors found through experiments that when the above-mentioned specific method for recovering ethylene and a vinyl-based comonomer is used, the residual ethylene monomer and vinyl-based comonomer contained in the product obtained in the polymerization reaction between ethylene and the vinyl-based comonomer are phase-separated in a gaseous state, and are then again compressed under high pressure to undergo the polymerization reaction, the loss of the residual monomer is minimized. The present invention has been completed on the basis of such finding.

In particular, when recovering ethylene and a vinyl-based comonomer according to the one embodiment, the concentration of ethylene having a relatively low boiling point in the mixture of residual ethylene and vinyl comonomer can be increased by additionally supplying ethylene at the time of recovering ethylene and the vinyl-based comonomer at a low pressure of 0.1 bar to 5 bar, unlike the existing method of recovering unreacted monomers. Thereby, the average boiling point of the mixture of the residual ethylene and the vinyl-based comonomer can be lowered, whereby under the same temperature and pressure conditions, a larger amount of ethylene and vinyl-based comonomer is recovered in a gaseous state and thus the content of ethylene and the vinyl-based comonomer remaining in the final product can be greatly reduced as compared with the conventional one.

As described above, ethylene that is additionally charged in the recovering process is a main reaction material used in the polymerization reaction of the ethylene copolymer. Even if ethylene is charged during the recovering step, there is no possibility of causing side reactions. The existing process and equipment can be used as they are through the method of charging a part of the reaction raw materials used in the polymerization reaction of the ethylene copolymer in the recovery apparatus.

Further, in the method for recovering ethylene and the vinyl-based comonomer according to the one embodiment, multi-stage depressurization of three or more stages is performed during the depressurization step for recovering unreacted monomers, thus ensuring economic efficiency of the process. Specifically, after the polymerization step of ethylene and the vinyl-based comonomer, the process of depressurizing the product obtained in the polymerization step to a pressure of 0.1 bar to 5 bar does not proceed all at once, but for example, the process can be carried out by sequentially undergoing a first depressurization step of reducing the pressure to 200 bar to 300 bar, a second depressurization step of reducing the pressure to 40 bar to 60 bar, and a third depressurization step of reducing the pressure to 0.1 bar to 5 bar. After the depressurization step, the unreacted monomers separated in a gaseous state at a high pressure can be compressed again to a high pressure to induce a reaction between the monomers.

In this manner, the method for recovering the ethylene and the vinyl comonomer according to the above embodiment, in which the compression is progressed from the respective pressures after separating them while lowering the pressure step by step, reduces the cost required for the compression process, thus ensuring the economic efficiency of the process.

Specifically, the method of recovering ethylene and the vinyl-based comonomer according to one embodiment will be described for each step. First, the above-described method of recovering ethylene and the vinyl-based comonomer can include a step of polymerizing ethylene and the vinyl-based comonomer at a pressure of 1500 bar or more.

The polymerization of ethylene and the vinyl-based comonomer can proceed at a high pressure of 1500 bar or more, or 1500 bar to 2500 bar. An example of a method for maintaining a high pressure of 1500 bar or more is not particularly limited, but for example, a multi-stage compressor may be disposed in a front stage of the reactor in which the polymerization reaction of ethylene and the vinyl-based comonomer is carried out, and thereby the internal pressure of the reactor can be maintained at a high pressure. In this case, the temperature inside the reactor may be 150° C. to 250° C., that is, the polymerization of ethylene and the vinyl-based comonomer may be carried out at a temperature of 150° C. to 250° C.

The vinyl-based comonomer means an organic compound containing a vinyl functional group capable of addition polymerization with ethylene in a molecule excluding ethylene, and examples thereof include one or more alpha olefins or vinyl acetates selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene.

Examples of the specific reaction conditions in the polymerization step of the ethylene and the vinyl-based comonomer are not particularly limited, and the types and amounts of specific catalysts, initiators, and the like are not particularly limited. Those known in the field of addition polymerization can be used without limitation.

Further, the method of recovering ethylene and the vinyl comonomer according to the above embodiment can include a step of depressurizing the product obtained in the polymerization step including the ethylene-vinyl-based comonomer polymer, ethylene, and the vinyl-based comonomer to 0.1 bar to 5 bar.

The product obtained in the polymerization step may include the ethylene-vinyl-based comonomer polymer, ethylene, and the vinyl-based comonomer. That is, the polymerization step is a step of polymerizing ethylene and the vinyl-based comonomer at a pressure of 1500 bar or more, and the product obtained in the polymerization step may include not only an ethylene-vinyl comonomer polymer formed by polymerization of ethylene and the vinyl-based comonomer, but also ethylene and the vinyl-based comonomer as residual monomers that remain without being involved in the reaction.

Through the step of depressurizing the product obtained in the polymerization step to 0.1 bar to 5 bar, a mixture of ethylene and the vinyl-based comonomer, which is a residual monomer contained in the product obtained in the polymerization step, can be converted into a gaseous state and also separated from a polymer which is a desired reaction product.

Preferably, a step of depressurizing the product obtained in the polymerization step to 0.1 bar to 5 bar may include a first depressurization step of reducing the pressure to 200 bar to 300 bar, a second depressurization step of reducing the pressure to 40 bar to 60 bar, and a third depressurization step of reducing the pressure to 0.1 bar to 5 bar after the second depressurization step.

That is, the step of depressurizing the product obtained in the polymerization step carried out at a pressure of 1500 bar or more, to 0.1 bar to 5 bar, does not proceed by a single step, but can proceed in multiple steps over three stages.

Further, after completion of the first depressurization step and the second depressurization step, the method may further include a step of pressurizing the ethylene and the vinyl-based comonomer separated in a gaseous state to 1500 bar or more. The ethylene and the vinyl-based comonomer thus pressurized to 1500 bar or more can again undergo a polymerization reaction to form an ethylene-vinyl-based comonomer copolymer.

Specifically, after the first depressurization step, the method may further include a step of separating the ethylene and the vinyl-based comonomer in a gaseous state and then applying the pressure to 1500 bar or more. After the second depressurization step, the method may include a step of separating the ethylene and the vinyl-based comonomer in a gaseous state and applying the pressure to 1500 bar or more.

After the depressurization step, an example of a specific method of separating ethylene and the vinyl-based comonomer in a gaseous state and applying the pressure of 1500 bar or more is not particularly limited, but for example, as shown in the FIGURE, a method in which the product obtained in the polymerization step is charged into separators 4 and 5 and separated using the method of discharging the gasified ethylene and the vinyl-based comonomer in the upper portion of the separators 4 and 5, and then the gasified ethylene and vinyl-based comonomer discharged from the upper portion of the separators 4 and 5 are compressed through compressors 7 and 8, can be used.

That is, in the first depressurization step of reducing the pressure to 200 bar to 300 bar or the depressurization step subsequent to the second depressurization step of reducing the pressure to 40 bar to 60 bar, the width of the pressure that needs to increase so as to reach 1500 bar or more is reduced as compared with the depressurization step subsequent to the second depressurization step of reducing the pressure to 0.1 bar to 5 bar, and thus the compression costs required for the pressurization step can be relatively reduced.

Therefore, as the step of depressurizing the product obtained in the polymerization step to 0.1 bar to 5 bar progresses in multiple steps of three or more stages, the amount of residual monomers separated at the low pressure of 0.1 bar to 5 bar can be reduced. This makes it possible to reduce the cost of compressing the residual monomer separated at the low pressure of 0.1 bar to 5 bar to the high pressure of 1500 bar or more.

In particular, when the pressure in the second depressurization step after the first depressurization step, which depressurizes the product obtained in the polymerization step to 200 bar to 300 bar during depressurization of three steps, is adjusted to 40 bar to 60 bar, the cost in the pressurizing stage after the overall depressurization step can be minimized.

Further, the process for recovering the ethylene and the vinyl-based comonomers according to the one embodiment may include a step of adding ethylene to the product obtained in the polymerization step under the pressure of 0.1 bar to 5 bar. By adding ethylene to the product obtained in the polymerization step under the pressure of 0.1 bar to 5 bar, the concentration of ethylene in the mixture of ethylene and the vinyl-based comonomer, which is the residual monomer contained in the product obtained in the polymerization step, can be relatively increased, and the average boiling point of the residual monomer mixture can be lowered to minimize the content of residual monomer in the final product.

More specifically, in the product obtained in the polymerization step to which ethylene is added, the content of ethylene may be 40% to 90% by weight based on the weight of the mixture of ethylene and the vinyl-based comonomer.

That is, in the step of adding ethylene to the product obtained in the polymerization step under the pressure of 0.1 bar to 5 bar, the boiling point of the vinyl-based comonomer is higher than the boiling point of ethylene. Accordingly, when the concentration of ethylene is increased by further adding ethylene with respect to the mixture of ethylene and the vinyl-based comonomer, the average boiling point of the mixture of ethylene and the vinyl-based comonomer may be lowered.

Specifically, the average boiling point of ethylene and the vinyl-based comonomer contained in the product obtained in the step of adding ethylene may be lower than the average boiling point of ethylene and the vinyl-based comonomer contained in the product obtained in the polymerization step. The average boiling point means a temperature at which 50% of the vinyl-based comonomer is separated and discharged in a gaseous state under 1 atm.

More specifically, in the product obtained in the polymerization step to which ethylene is added, the average boiling point of the mixture of ethylene and the vinyl-based comonomer may be 60° C. or less, or 20° C. to 55° C.

The content of ethylene added to the product obtained in the polymerization step is 1% to 45% by weight, or 3% to 40% by weight, or 5% to 37% by weight, based on the weight of the ethylene-vinyl comonomer polymer contained in the product obtained in the polymerization step. If the addition amount of ethylene is less than 1% by weight, the degree of improvement in the ethylene concentration in the monomer mixture due to the addition of ethylene may be insignificant. If the addition amount of ethylene exceeds 45% by weight and thus is excessively increased, the content of ethylene that must be used in the initial polymerization reaction decreases and thereby the content of ethylene in the monomer reactant, which is separated subsequent to the polymerization reaction and used in the re-polymerization reaction, may be larger than the content of the polymer to be synthesized.

As shown in the FIGURE, a part of the ethylene added to the product obtained in the polymerization step is supplied from a container 2 containing the ethylene monomer supplied to a polymerization reactor 3. Consequently, if the content of ethylene added to the product obtained in the polymerization step excessively increases, there may be a problem that the content of the ethylene monomer to be supplied to the polymerization reactor 3 decreases.

Meanwhile, the method for recovering ethylene and the vinyl-based comonomer according to the one embodiment may include a step of separating ethylene and the vinyl-based comonomer from the product obtained in the polymerization step to which ethylene is added.

Through a step of adding ethylene to the product obtained in the polymerization step under the pressure of 0.1 bar to 5 bar, the mixture of ethylene and the vinyl-based comonomer contained in the product obtained in the polymerization step can be converted into a gaseous state, whereby the mixture of ethylene and the vinyl-based comonomer can be separated from the product obtained in the polymerization step and reused.

The step of separating ethylene and the vinyl-based comonomer from the product obtained in the polymerization step to which ethylene is added can be carried out at a temperature of 150° C. to 200° C., so that the monomer remaining in the final product can be effectively removed.

An example of the step of separating ethylene and the vinyl-based comonomer from the product obtained in the polymerization step to which ethylene has been added is not particularly limited, but for example, as shown in the FIGURE, a method in which the product obtained in the polymerization step to which ethylene is added is charged in a separator 6 that is kept at temperature of 150° C. to 200° C., and the gasified ethylene and vinyl-based comonomer are discharged in the upper portion of the separator 6.

After the step of separating ethylene and the vinyl-based comonomer from the product obtained in the polymerization step, the method may further include a step of pressurizing the separated ethylene and vinyl-based comonomer to 1500 bar or more. Through the step of pressurizing the separated ethylene and vinyl-based comonomer to 1500 bar or more, ethylene and the vinyl-based comonomer are charged in a high pressure polymerization reactor, and the re-polymerization reaction can proceed.

An example of a specific method of pressurizing the separated ethylene and vinyl-based comonomer to 1500 bar or more is not particularly limited, but for example, as shown in the FIGURE, a method in which the gasified ethylene and vinyl-based comonomer discharged in the upper portion of the separator 6 is compressed through the compressors 7, 8, and 9 may be used.

On the other hand, in the step of separating ethylene and the vinyl-based comonomer from the product obtained in the polymerization step to which ethylene is added, the content of the ethylene and the vinyl-based comonomer contained in the product obtained in the polymerization step in which the ethylene and vinyl-based comonomer are separated may be 0.6% by weight or less, or 0.1% to 0.6% by weight, or 0.2% to 0.6% by weight. In this manner, the method for recovering ethylene and the vinyl-based comonomer according to one embodiment is a simple and low-cost method of additionally charging ethylene, which is used as a reactant, into a reduced-pressure reactor, thereby achieving a remarkable improvement in the rate of recovery of unreacted monomer as compared with a recovery method that is conventionally used.

Advantageous Effects

According to the present invention, a method for recovering ethylene and a vinyl-based comonomer that is capable of improving the rate of recovery of unreacted monomers remaining after a polymerization reaction of ethylene and the vinyl-based comonomer and increasing the process efficiency through the reduction of costs can be provided.

BRIEF DESCRIPTION OF THE DRAWINGS

The FIGURE schematically shows the apparatus and process for recovering ethylene and vinyl-based comonomer according to one embodiment.

DETAILED DESCRIPTION OF THE EMBODIMENTS

Hereinafter, the present invention will be described in more detail by way of Examples. However, these Examples are given for illustrative purposes only, and the scope of the invention is not intended to be limited by these Examples.

Examples 1 to 7: Recovery of Ethylene and Vinyl-Based Comonomer

Referring to the FIGURE, vinyl acetate monomers from a container 1 and ethylene monomers from a container 2 were respectively charged into a reactor 3 having a temperature of about 150° C. to 250° C. and a pressure of 2000 bar to undergo a free radical polymerization reaction. After the reaction was completed, the mixture of an ethylene-vinyl acetate polymer and unreacted monomers inside the reactor 3 was transferred to a first separator 4 having a temperature of about 200° C. to 250° C. and a pressure of 250 bar.

In the first separator 4, the mixture of unreacted monomers was separated in a gaseous state in the upper portion of the first separator 4, and the ethylene-vinyl acetate polymer and some mixtures of unreacted monomers were separated in a liquid phase in the lower portion of the first separator 4. The mixture of unreacted monomers separated in the upper portion of the first separator 4 was compressed to a pressure of 2000 bar through a first compressor 7 having a pressure of 250 bar and then subjected to a polymerization reaction in the reactor 3. The ethylene-vinyl acetate polymer and the mixture of unreacted monomers separated in the lower portion of the first separator 4 were transferred to a second separator 5 having a temperature of about 150° C. to 200° C. and a pressure of 50 bar.

In the second separator 5, the mixture of unreacted monomers was separated in a gaseous state in the upper portion of the second separator 5, and the ethylene-vinyl acetate polymer and some mixture of unreacted monomers were separated in a liquid phase in the lower portion of the second separator 5. The mixture of unreacted monomers separated in the upper portion of the second separator 5 was transferred to a second compressor 8 having a pressure of 50 bar and compressed to a pressure of 250 bar and then allowed to undergo a polymerization reaction in the residence reactor 3 via the first compressor 7 having a pressure of 2000 bar.

The ethylene-vinyl acetate polymer and the mixture of unreacted monomers separated in the lower portion of the second separator 5 were transferred to a third separator 6 having a temperature of about 150° C. to 200° C. and a pressure of 1 bar, and then an ethylene monomer was additionally charged into the third separator 6 from the container 2 containing the ethylene monomer. At this time, based on the weight of the ethylene-vinyl acetate polymer contained in the third separator 6, the charging amount of the ethylene monomer was adjusted as shown in Table 1 below.

Thereafter, in the third separator 6, the mixture of unreacted monomers was separated in a gaseous state in the upper portion of the third separator 6. The mixture of unreacted monomers separated in the upper portion of the third separator 6 was transferred to a third compressor 9 having a pressure of 1 bar and compressed to a pressure of 50 bar and then compressed to a pressure of 250 bar in the second compressor 8, compressed to a pressure of 2000 bar via the first compressor 7, and then the polymerization reaction was proceeded in the reactor 3 to recover ethylene and vinyl acetate.

Comparative Example: Recovery of Ethylene and Vinyl-Based Comonomer

As shown in Table 1 below, after the ethylene-vinyl acetate polymer and the mixture of unreacted monomers separated in the lower portion of the second separator 5 were transferred to the third separator 6 having a temperature of 170° C. and a pressure of 1 bar, the recovery of ethylene and vinyl acetate was carried out in the same manner as in examples above, except that the step of additionally charging the ethylene monomer from a container 2 to a third separator 6 was omitted.

TABLE 1

Content of ethylene monomer (based on the weight of the ethylene-vinyl acetate polymer) charged in the third separator 6

| Category | Example 1 | Example 2 | Example 3 | Example 4 | Example 5 | Example 6 | Example 7 | Comparative Example |
|---|---|---|---|---|---|---|---|---|
| Charging amount of ethylene mononmer (wt %) | 37 | 32 | 26 | 21 | 16 | 11 | 5 | 0 |

Experimental Example: Measurement of Efficiency of the Recovery Methods of Ethylene and Vinyl-Based Comonomer of Examples and Comparative Example 1. Average Boiling Point of the Mixture of Unreacted Monomers Contained in the Third Separator In the above examples and comparative example, the content of ethylene in the mixture of unreacted monomers and the average boiling point (1 atmospheric pressure condition) of the mixture of unreacted monomers depending on the content of ethylene monomer charged in a third separator 6 in the examples and comparative example were measured through a process simulation program, and the results are shown in Table 2 below.

TABLE 2

Average boiling point of the mixture of unreacted monomers depending on the content of ethylene monomer charged in the third separator 6

| Category | Example 1 | Example 2 | Example 3 | Example 4 | Example 5 | Example 6 | Example 7 | Comparative Example |
|---|---|---|---|---|---|---|---|---|
| Charging amount of ethylene monomer (wt %) | 37 | 32 | 26 | 21 | 16 | 11 | 5 | 0 |
| Content of ethylene in the mixture of unreacted monomers (wt %) | 81 | 79 | 76 | 72 | 68 | 61 | 51 | 33 |
| Average boiling point (° C.) | 20.6 | 23.7 | 27 | 31.2 | 36.5 | 43.5 | 54 | 72.6 |

As shown in Table 2 above, in the case of the recovery methods of ethylene and vinyl acetate according to the examples, the average boiling point of the mixture of unreacted monomers contained in the third separator was measured to be low, whereas in the case of the comparative example, it was measured to be relatively high as compared with the examples.

That is, unlike the comparative example, the above examples can charge additional ethylene monomer into the third separator 6, thereby increasing the content of ethylene in the mixture of unreacted monomers. Consequently, the average boiling point of the mixture of unreacted monomers can be lowered, thus realizing more improvement in the rate of recovery of ethylene and vinyl acetate under the same temperature and pressure conditions.

2. Content of Residual Monomers Contained in the Final Product

The content of residual monomers contained in the final product depending on the content of ethylene monomers charged in the third separator 6 in the examples and comparative examples was measured, and the results are shown in Table 3 below.

TABLE 3

Content of residual monomers (based on the weight of the final product) contained in the final product depending on the content of ethylene monomer charged in the third separator 6

| Category | Example 1 | Example 2 | Example 3 | Example 4 | Example 5 | Example 6 | Example 7 | Comparative Example |
|---|---|---|---|---|---|---|---|---|
| Charging amount of ethylene monomer (wt %) | 37 | 32 | 26 | 21 | 16 | 11 | 5 | 0 |

TABLE 3-continued

Content of residual monomers (based on the weight of the final product) contained in the final product depending on the content of ethylene monomer charged in the third separator 6

| Category | Example 1 | Example 2 | Example 3 | Example 4 | Example 5 | Example 6 | Example 7 | Comparative Example |
|---|---|---|---|---|---|---|---|---|
| Content of residual monomer in final product (wt %) | 0.24 | 0.26 | 0.28 | 0.31 | 0.36 | 0.44 | 0.58 | 0.89 |

As shown in Table 3, in the case of the recovery methods of ethylene and vinyl acetate according to the examples, the content of residual monomers in the final product was measured as low as 0.24 to 0.58% by weight, and in the case of the comparative example, the content of residual monomers was 0.89% by weight, which was relatively higher than in the examples.

That is, unlike the comparative example, it was confirmed that the examples charge additional ethylene monomer into the third separator 6, thereby minimizing unreacted monomers remaining in the final product and improving the rate of recovery of ethylene and vinyl acetate.

EXPLANATION OF SIGNS

1: Container containing vinyl acetate monomer
2: Container containing ethylene monomer
3: Reactor
4: First separator
5: Second separator
6: Third separator
7: First compressor
8: Second compressor
9: Third compressor

The invention claimed is:

1. A method for recovering ethylene and a vinyl-based comonomer, comprising:
a polymerization step of polymerizing ethylene and a vinyl-based comonomer at a pressure of 1500 bar or more;
a step of depressurizing a product obtained in the polymerization step including an ethylene-vinyl-based comonomer polymer, ethylene, and a vinyl-based comonomer to 0.1 bar to 5 bar;
a step of adding ethylene to the product obtained in the polymerization step under a pressure of 0.1 bar to 5 bar; and
a step of separating ethylene and vinyl-based comonomer from the product obtained in the polymerization step to which ethylene is added.

2. The method for recovering ethylene and a vinyl-based comonomer according to claim 1, wherein a content of ethylene added to the product obtained in the polymerization step is 1% to 45% by weight, based on the weight of the ethylene-vinyl-based comonomer polymer contained in the product obtained in the polymerization step.

3. The method for recovering ethylene and a vinyl-based comonomer according to claim 1, wherein a boiling point of the vinyl-based comonomer is higher than a boiling point of ethylene.

4. The method for recovering ethylene and a vinyl-based comonomer according to claim 1, wherein the vinyl-based comonomer includes one or more vinyl acetates or alpha olefins selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene.

5. The method for recovering ethylene and a vinyl-based comonomer according to claim 1, wherein in the product obtained in the polymerization step to which ethylene is added, a content of ethylene is 40% to 90% by weight based on the weight of a mixture of ethylene and the vinyl-based comonomer.

6. The method for recovering ethylene and a vinyl-based comonomer according to claim 1, wherein an average boiling point of ethylene and the vinyl-based comonomer contained in the product obtained in the polymerization step to which ethylene is added is lower than an average boiling point of ethylene and the vinyl-based comonomer contained in the product obtained in the polymerization step.

7. The method for recovering ethylene and a vinyl-based comonomer according to claim 1, wherein an average boiling point of ethylene and vinyl-based comonomer contained in the product obtained in the polymerization step to which ethylene is added is 60° C. or less.

8. The method for recovering ethylene and a vinyl-based comonomer according to claim 1, wherein the step of separating ethylene and vinyl-based comonomer from the product obtained in the polymerization step to which ethylene is added is carried out at a temperature of 150° C. to 200° C.

9. The method for recovering ethylene and a vinyl-based comonomer according to claim 1, further comprising a step of pressurizing separated ethylene and vinyl-based comonomer to 1500 bar or more, after the step of separating ethylene and vinyl-based comonomer from the product obtained in the polymerization step to which ethylene is added.

10. The method for recovering ethylene and a vinyl-based comonomer according to claim 1, wherein the step of depressurizing the product obtained in the polymerization step to 0.1 bar to 5 bar includes:
a first depressurization step of reducing the pressure to 200 bar to 300 bar;
a second depressurization step of reducing the pressure to 40 bar to 60 bar; and
a third depressurization step of reducing the pressure to 0.1 bar to 5 bar.

11. The method for recovering ethylene and a vinyl-based comonomer according to claim 10, further comprising a step of separating ethylene and vinyl-based comonomer in a gaseous state and then applying a pressure of 1500 bar or more, after the first depressurization step.

12. The method for recovering ethylene and a vinyl-based comonomer according to claim 10, further comprising a step of separating ethylene and vinyl-based comonomer in a gaseous state and then applying a pressure of 1500 bar or more, after the second depressurization step.

13. The method for recovering ethylene and a vinyl-based comonomer according to claim 1, wherein the polymerization step of polymerizing ethylene and a vinyl-based comonomer proceeds at a high pressure of 1500 bar to 2500 bar.

14. The method for recovering ethylene and a vinyl-based comonomer according to claim 1, wherein a content of ethylene and vinyl-based comonomer contained in the product obtained in the polymerization step is 0.6% by weight or less, based on the weight of ethylene and vinyl-based comonomer separated from the product obtained in the polymerization step to which ethylene is added.

* * * * *